(12) United States Patent
Bhatnagar

(10) Patent No.: US 8,730,825 B2
(45) Date of Patent: May 20, 2014

(54) PACKET RETRANSMISSION OPTIMIZATION IN WIRELESS NETWORK

(75) Inventor: Shalabh Bhatnagar, Bangalore (IN)

(73) Assignee: Indian Institute of Science (IN)

( * ) Notice: Subject to any disclaimer, the term of this patent is extended or adjusted under 35 U.S.C. 154(b) by 545 days.

(21) Appl. No.: 12/533,112

(22) Filed: Jul. 31, 2009

(65) Prior Publication Data

US 2010/0302955 A1    Dec. 2, 2010

(30) Foreign Application Priority Data

May 26, 2009    (IN) .......................... 01217/CHE/2009

(51) Int. Cl.
*H04L 12/26* (2006.01)

(52) U.S. Cl.
USPC ........... 370/252; 370/445; 370/465; 370/332; 455/522; 455/436

(58) Field of Classification Search
USPC ......... 370/252, 445, 465, 241, 332, 235, 310, 370/329, 341, 412, 278; 455/522, 436; 703/13; 714/748, 749, 801
See application file for complete search history.

(56) References Cited

U.S. PATENT DOCUMENTS

| | | | | |
|---|---|---|---|---|
| 5,629,942 A | * | 5/1997 | Zijderhand | 370/341 |
| 6,317,854 B1 | * | 11/2001 | Watanabe | 714/749 |
| 6,999,441 B2 | * | 2/2006 | Flammer et al. | 370/337 |
| 7,055,090 B2 | * | 5/2006 | Kikuchi et al. | 714/801 |
| 7,570,596 B2 | * | 8/2009 | Pan et al. | 370/241 |
| 2001/0055280 A1 | * | 12/2001 | Honda et al. | 370/278 |
| 2005/0249185 A1 | | 11/2005 | Poor et al. | |
| 2006/0233200 A1 | | 10/2006 | Fifield et al. | |
| 2008/0002599 A1 | | 1/2008 | Yau et al. | |
| 2008/0205276 A1 | * | 8/2008 | Inukai et al. | 370/235 |
| 2009/0003369 A1 | * | 1/2009 | Lundin | 370/412 |

FOREIGN PATENT DOCUMENTS

WO    2006096022    9/2006

OTHER PUBLICATIONS

Anshuk Chakraborty and Shalabh Bhatnagar, "Optimized Policies for the Retransmission Probabilities in Slotted Aloha", In Simulation, vol. 86, No. 4, pp. 1-33.
PCT International Search Report and Written Opinion, Sep. 21, 2010.

* cited by examiner

*Primary Examiner* — Charles C Jiang
*Assistant Examiner* — Jamal Javaid
(74) *Attorney, Agent, or Firm* — Ren-Sheng International

(57) ABSTRACT

Embodiments of the present disclosure set forth methods for determining a probability of retransmitting a packet in a time slot for a source node in a wireless network. Some example methods include determining whether transmission of the packet in the time slot is successful, measuring a number of time slots accumulated since a most recent successful transmission of the packet by the source node, and determining a first value of the probability based on a second value associated with the number of time slots accumulated.

11 Claims, 7 Drawing Sheets

600 A computer program product 602 at least one of one or more instructions for determining a probability of retransmitting a packet in a time slot for a source node in a wireless network;

one or more instructions for determining whether transmission of the packet in the time slot is successful;

one or more instructions for calculating a set of threshold values based on an integer and a predetermined rule;

one or more instructions for measuring a number of time slots accumulated since a most recent successful transmission of the packet by the source node;

one or more instructions for deriving an initial value of the probability based on the number of time slots accumulated and the set of threshold values; or one or more instructions for determining a first value of the probability based on the initial value of the probability, a second value associated with the measured number of time slots and a third value associated with the measured number of time slots

| 604 a signal bearing medium | 606 a communication medium |
| 608 a computer readable medium | 610 a recordable medium |

FIG. 6 ers states : Vol. 3 No. US 8,730,825 B2

PACKET RETRANSMISSION OPTIMIZATION IN WIRELESS NETWORK

CROSS REFERENCE TO RELATED APPLICATIONS

This application claims priority to Indian Patent Application 1217/CHE/2009, filed on May 26, 2009.

BACKGROUND OF THE DISCLOSURE

A wireless network may include a plurality of nodes, including a source node configured to transmit a packet and a destination node configured to receive the packet. After having successfully received the packet, the destination node may acknowledge the reception by sending a confirmation of receipt to the source node. In some circumstances, when two or more packets are transmitted in the same time slot by different source nodes, the transmission of the packets may be unsuccessful. To establish whether such unsuccessful transmission occurs, the source node waits to receive the confirmation of receipt from the destination node for a period of time. If no confirmation is received within this period of time, the source node may deem the transmission to be unsuccessful and initiate the retransmission of the packet in a successive time slot with a certain probability, which sometimes is referred to as a retransmission probability. There are existing approaches that attempt to assign the retransmission probability to one or more source nodes in a wireless network, but these approaches are faced with challenges introduced by the various traffic characteristics on the source nodes.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the present disclosure and are therefore not to be considered limiting of the scope of the disclosure. The disclosure will be described with additional specificity and detail through use of the accompanying drawings.

In the drawings:

FIG. 6 is a block diagram illustrating a computer program product for determining a retransmission probability for a source node in a wireless network, all arranged in accordance with at least some embodiments of the present disclosure.

DETAILED DESCRIPTION

Figure 1A:
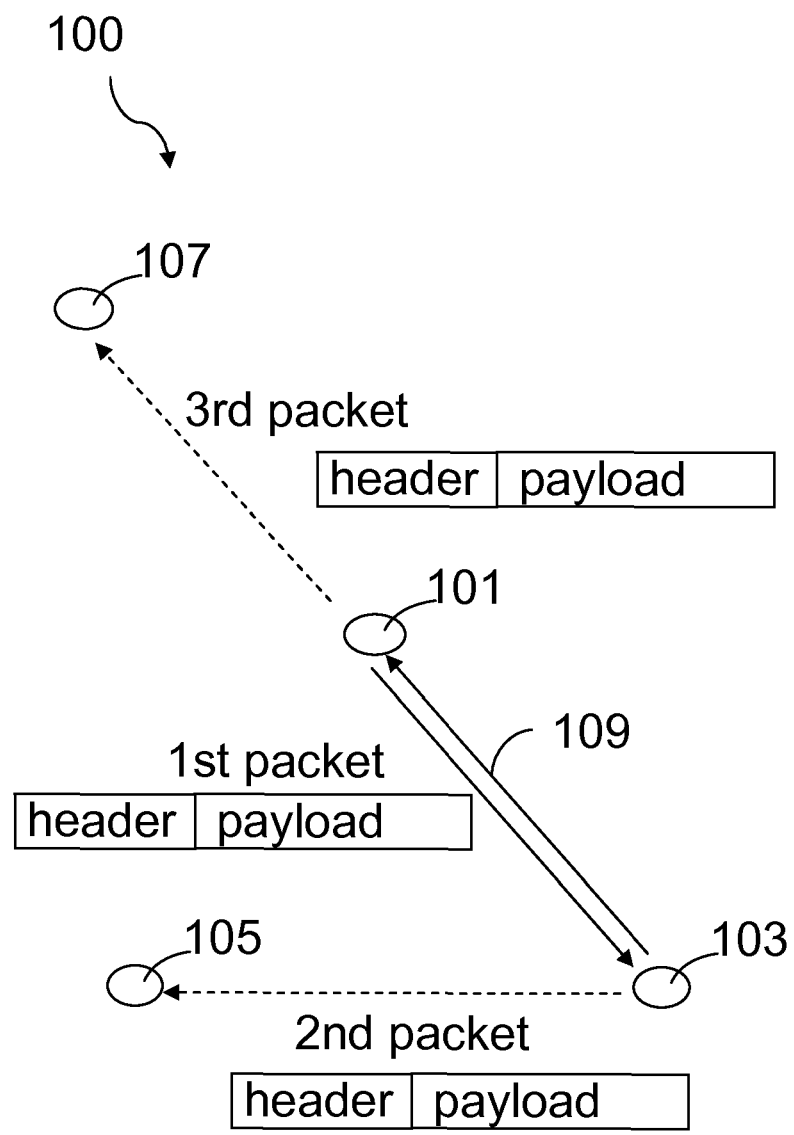
FIG. 1A illustrates one configuration of a wireless network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs, and systems related to optimizing packets retransmission in a wireless network.

In this disclosure, a "source node" refers to a node configured to transmit a packet. A "destination node" refers to a node configured to receive a packet originated from a "source node." A "central node" refers to a node configured to relay a packet transmitted from a source node to a destination node. The term "retransmission probability" refers to the probability of a node retransmitting a packet in a next time slot. The term "LAST" corresponds to the most recent.

FIG. 1A illustrates one configuration of a wireless network 100 that includes a plurality of nodes (e.g., a first node 101, a second node 103, a third node 105, and a fourth node 107), arranged in accordance with at least some embodiments of the present disclosure. A packet may be transmitted among the plurality of nodes. Suppose a first packet is transmitted from the first node 101 to the second node 103 within a first time slot, and a second packet is not transmitted in the wireless network 100 within the same first time slot. The first packet may not collide with the second packet. Without the collision, the second node 103 may receive the first packet successfully and may acknowledge the successful reception by sending a confirmation of receipt of the first packet (shown by an arrow 109) back to the first node 101.

When two or more packets are transmitted within the same time slot in the wireless network 100, the transmitted packets may collide, and the collision may cause the transmissions to fail. To illustrate, suppose the second node 103 sends the second packet to the third node 105 within a second time slot, and the first node 101 sends a third packet to the fourth node 107 also within the same second time slot. The second packet and the third packet may collide. Therefore, the third node 105 may not receive the second packet, and the fourth node 107 may not receive the third packet. The second node 103 may be configured to determine the transmission failure of the second packet, after the second node 103 fails to receive the acknowledgement of receipt of the second packet from the third node 105 within a predetermined time period. Similarly, the first node 101 may also be configured to determine whether the transmission of the third packet is successful based on the acknowledgement from the fourth node 107. In response to the unsuccessful transmission, the second node 103 may be configured to retransmit the second packet in a successive time slot based on a first retransmission probability, and the first node 101 may be configured to retransmit the third packet in a successive time slot based on a second retransmission probability.

Figure 1B:
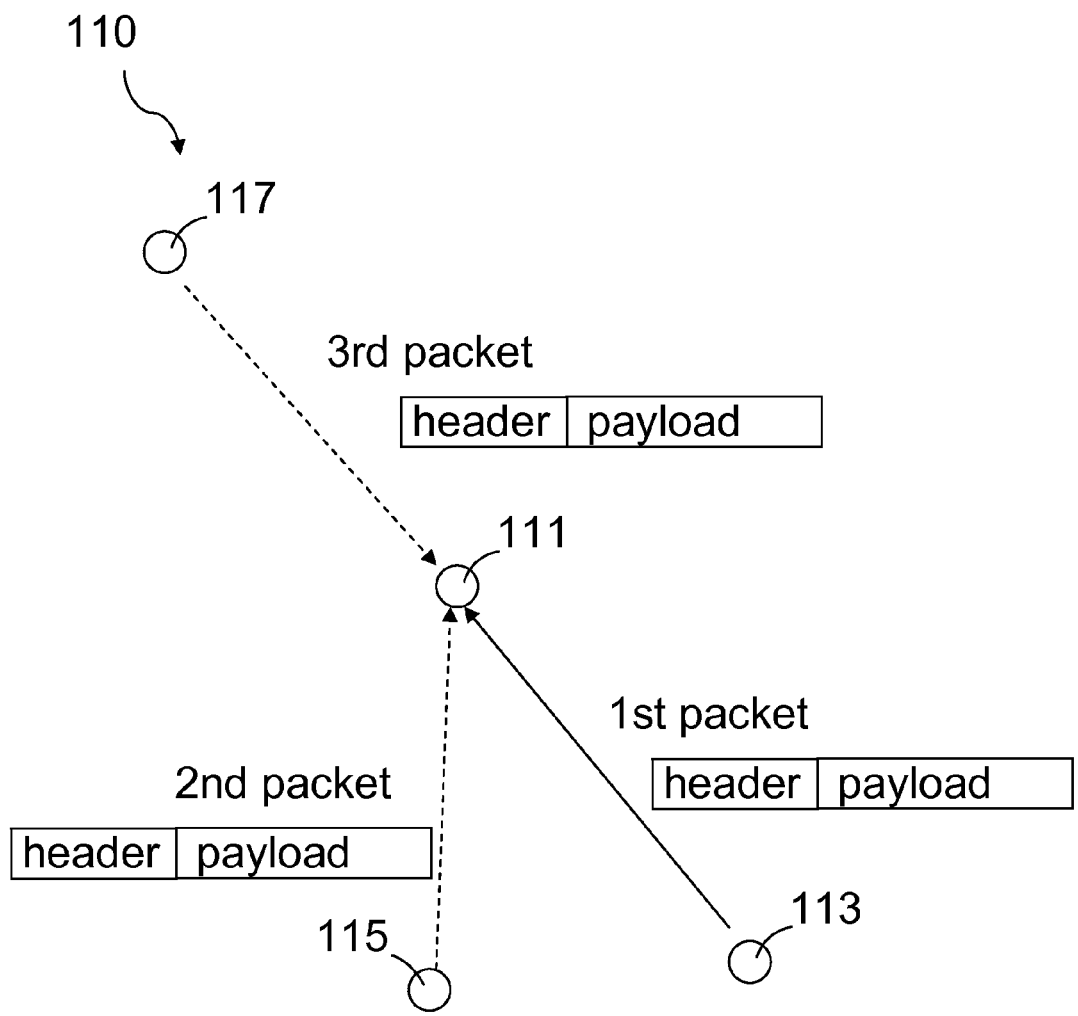
FIG. 1B illustrates another configuration of a wireless network.

In some other implementations, a packet may be transmitted among nodes in a wireless network through a central node which relays a packet from a source node to a destination node and controls the traffic in the wireless network. FIG. 1B illustrates another configuration of a wireless network 110 which includes a central node (e.g., node 111) and a plurality of nodes (e.g., a first node 113, a second node 115, and a third node 117). In some implementations, the central node may be a base station in the wireless network. In some implementations, the nodes can be, without limitation, a mobile device, a cell phone, a smart phone, a laptop computer, a personal digital assistant (PDA), a mobile internet device (MID), and a portable media player. A packet may be transmitted among the plurality of nodes (e.g., the first node 113, the second node 115, and the third node 117) through the central node 111. The central node 111 may be configured to relay a packet from a source node to a destination node, to determine the number of packets transmitted in a specified time slot, and to broadcast whether the packet is successfully transmitted in the specified time slot.

In some implementations, packets transmitted in the wireless network 110 from a source node may be relayed by the central node 111 to a destination node, and thus the central node 111 may determine how many packets transmitted by all source nodes in the wireless network 110 by counting the number of packets relayed by itself within a specified time slot. Suppose that the first node 113 transmits a first packet in a first time slot and the second node 115 and the third node 117 do not transmit any packet in the first time slot, the central node 111 determines one packet being transmitted in the first time slot and the transmission of the packet being successful, and broadcasts the information to all nodes (e.g., the first node 113, the second node 115, and the third node 117) in the wireless network 110. After receiving the broadcasted information, the first node 113 acknowledges that the transmission of the packet is successful.

As set forth above, suppose a second packet is transmitted by the second node 115 in a second time slot and a third packet is transmitted by the third node 117 in the same second time slot, the central node 111 determines two packets are transmitted in the second time slot, and the transmission for the two packets being unsuccessful because they are transmitted in the same time slot, and broadcasts the information to all nodes (e.g., the first node 113, the second node 115, and the third node 117) in the wireless network 110. After receiving the broadcasted information, the second node 115 and the third node 117 acknowledge the transmissions of the second packet and the third packet are unsuccessful, respectively. In response to the unsuccessful transmission, the second node 115 is configured to retransmit the second packet in a successive time slot with a first retransmission probability and the third node 117 is configured to retransmit the third packet in a successive time slot with a second retransmission probability.

Figure 2:
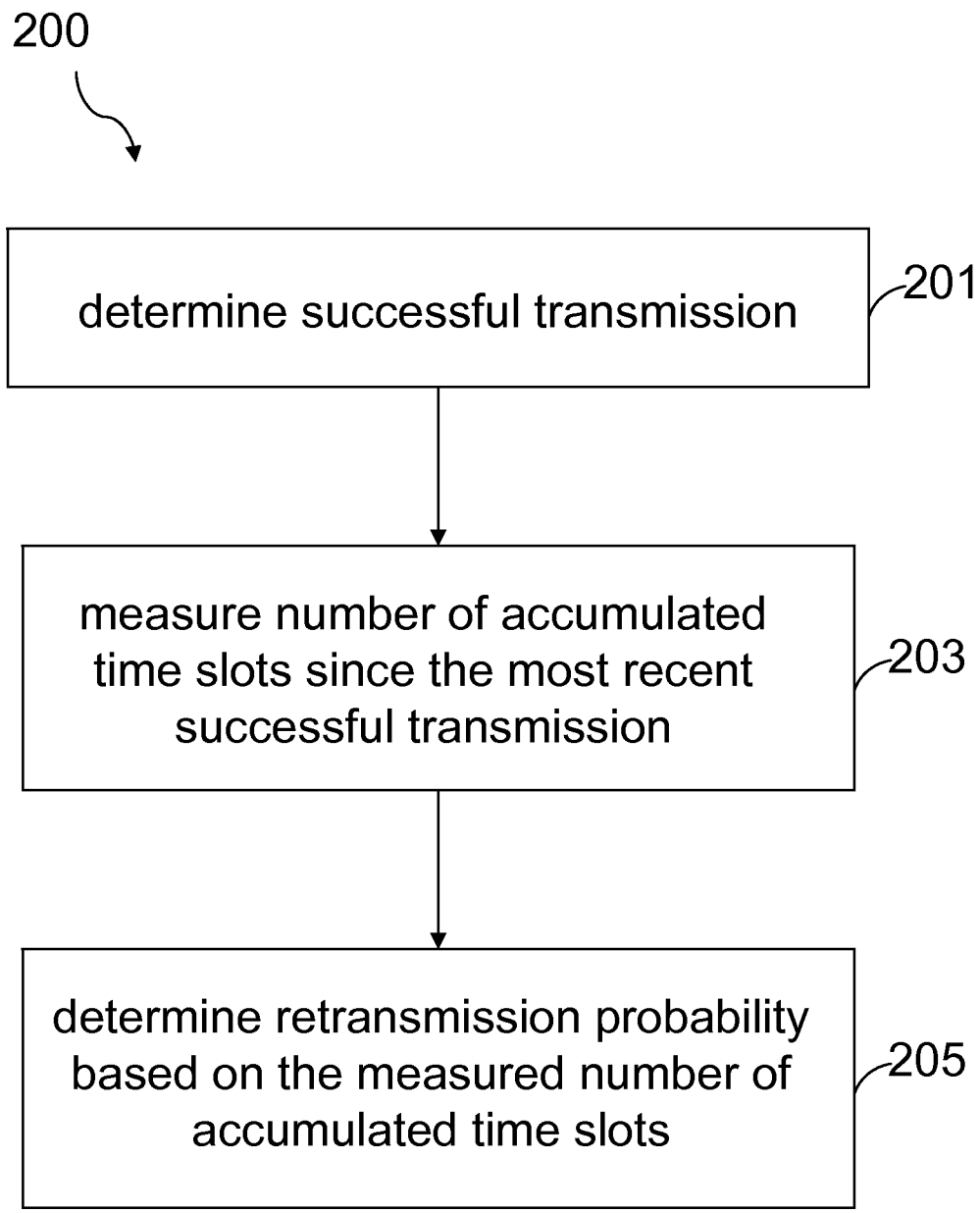
FIG. 2 is a flow chart illustrating an example process for determining a retransmission probability for a source node in a wireless network.

FIG. 2 is a flow chart illustrating an example process 200 for determining a retransmission probability for a source node in a wireless network, arranged in accordance with at least some embodiments of the present disclosure. The example process 200 may include one or more operations and/or functions that are represented as operations 201-205.

In an operation 201, a source node may determine that the successful transmission of a packet has taken place. With such determination, in the operation 203, the source node is configured to measure a number of time slots accumulated since the most recent successful transmission. After the number of time slots has been measured, the process 200 may proceed to an operation 205. In the operation 205, a retransmission probability for a source node may be determined based on the number of time slots measured in the operation 203.

As set forth above, in the operation 201, the source node may determine whether the packet transmission is successful. Various determination mechanisms may be implemented in different wireless networks. For example, the source node may determine that a packet is successfully transmitted to a destination node by having received a confirmation of receipt of the transmitted packet from the destination node. Alternatively, the source node may also determine that a particular packet is successfully transmitted to a destination node in a specified time slot by having received broadcast information indicating the transmission of one packet in the same specified time slot.

After the source node determines the successful transmission of a packet in a specified time slot, in the operation 203, the source node is configured to measure a number of time slots accumulated since the specified time slot. In some implementations, this number of time slots refers to the number of time slots that the source node fails to successfully transmit any packet or attempts to transmit any packet. The measurement may be based on the clock of the source node and/or a time stamp distributed by a central node.

To further illustrate, suppose more than one source node sends out packets in the same specified time slot, and the packets collide with one another and fail to reach their destination nodes. The source nodes may be configured to retransmit the packets in every subsequent time slot with a certain retransmission probability. In some implementations, the retransmission probability may be the same for all the source nodes in the wireless network. In some other implementations, the retransmission probability may vary among different source nodes in the wireless network. For example, if a source node has not successfully transmitted or attempted to transmit any packet for a long time and thus has accumulated a large number of time slots, then the source node may be assigned with a high retransmission probability to reduce the possible delay in the wireless network.

When a source node fails to transmit a packet successfully as the packet colliding with another packet transmitted in the same time slot, the source node may not transmit another new packet unless the collided packet has been successfully transmitted. In addition, a retransmission of the collided packet may once again result in another collision when another packet is transmitted in that time slot. If the collisions occur frequently, the retransmission probability may be reduced so as to lower the chance of collisions. Therefore, in the operation 205, the retransmission probability may be determined based on various traffic characteristics, including the number of time slots accumulated, for different source nodes in the wireless network. In some implementations, the determination may be made on the source node itself. In some other implementations, the determination may be made by a central node that controls some traffic of the wireless network.

Figure 3:
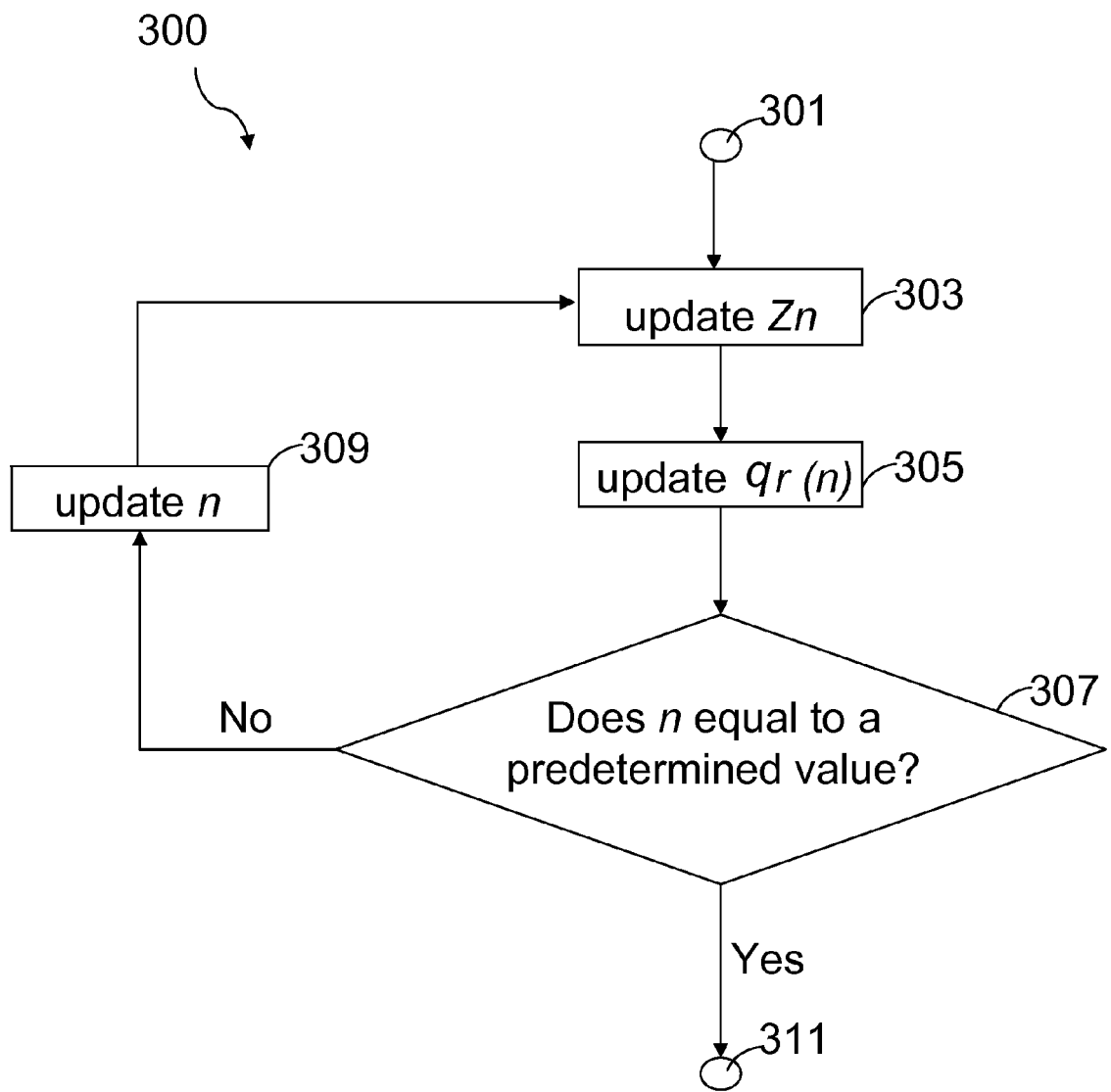
FIG. 3 is a flow chart illustrating an example process for determining appropriate retransmission probability for a source node in a wireless network through iteratively updating the values of $Z_n$.

FIG. 3 is a flow chart illustrating an example process 300 for determining appropriate retransmission probability for a source node in a wireless network through iteratively updating the values of $Z_n$, arranged in accordance with at least some embodiments of the present disclosure. The number of time slots accumulated since the most recent successful transmission $K_n$ is measured, and the values of $Z_n$ are updated accordingly. $Z_n$ generally refers to an estimate of the average cost for a retransmission probability function. In some implementations, the retransmission probability for a source node is determined by a central node in the wireless network based on the value of the updated $Z_n$.

In an operation 301, the parameters to be considered in the illustrated process are defined. Some examples of the parameters include, without limitation, a retransmission probability $q_r(n)$, a random variable $\eta(n)$, a first step-size function $a(n)$, a second step-size function $b(n)$, a positive constant $\beta$ and an object function $h(K_n)$, where n may be an integer. These example parameters are utilized to achieve efficient convergence. In some implementations, $a(n)=1/n$ and $b(n)$ equals to $1/n^\alpha$, where $\alpha$ is in a range between 0.5 and 1.0. Initial values of some parameters, such as, without limitation, $a(0)$, $b(0)$, $\eta(0)$, $Z_0$, and $q_r(0)$ are also defined in the operation 301.

In an operation 303, the value of $Z_n$ is updated based on the LAST value of $Z_n$, the second step-size function $b(n)$, the positive constant $\beta$, the random variable $\eta(n)$, and the object function $h(K_n)$. In some implementations, the object function $h(K_n)$ is defined as the following:

$$h(K_n) = \begin{cases} -1, & \text{if transmission is successful in the } n\text{th time slot} \\ 0, & \text{otherwise,} \end{cases} \quad (1)$$

In some implementations, the initial value of the object function $h(K_0)$ is an arbitrarily set value. In one example, the arbitrarily set value is zero.

The value of $Z_n$ may be updated based on the equation (2) described below:

$$Z_n = \text{LAST } Z_n + \text{LAST } b(n)(\text{LAST } \eta(n)(h(K_n) - \text{LAST } Z_n))/\beta \quad (2)$$

The example process 300 may then proceed to an operation 305. In the operation 305, the value of the retransmission probability may also be updated based on the equation (3) described below:

$$q_r(n) = \Upsilon (\text{LAST } q_r(n) + Z(n) \times \text{LAST } a(n)) \quad (3)$$

where $\Upsilon$ is a projection operator to keep the values of $q_r(n)$ to be within a range between 0 to 1.

In an operation 307, the value n is compared with a predetermined value. When n does not equal to the predetermined value, the example process 300 goes to an operation 309, where n is incremented by one. Then the operation 309 goes back to the operation 303. When n equals to the predetermined value, the example process 300 proceeds to operation 311 to terminate.

Figure 4:
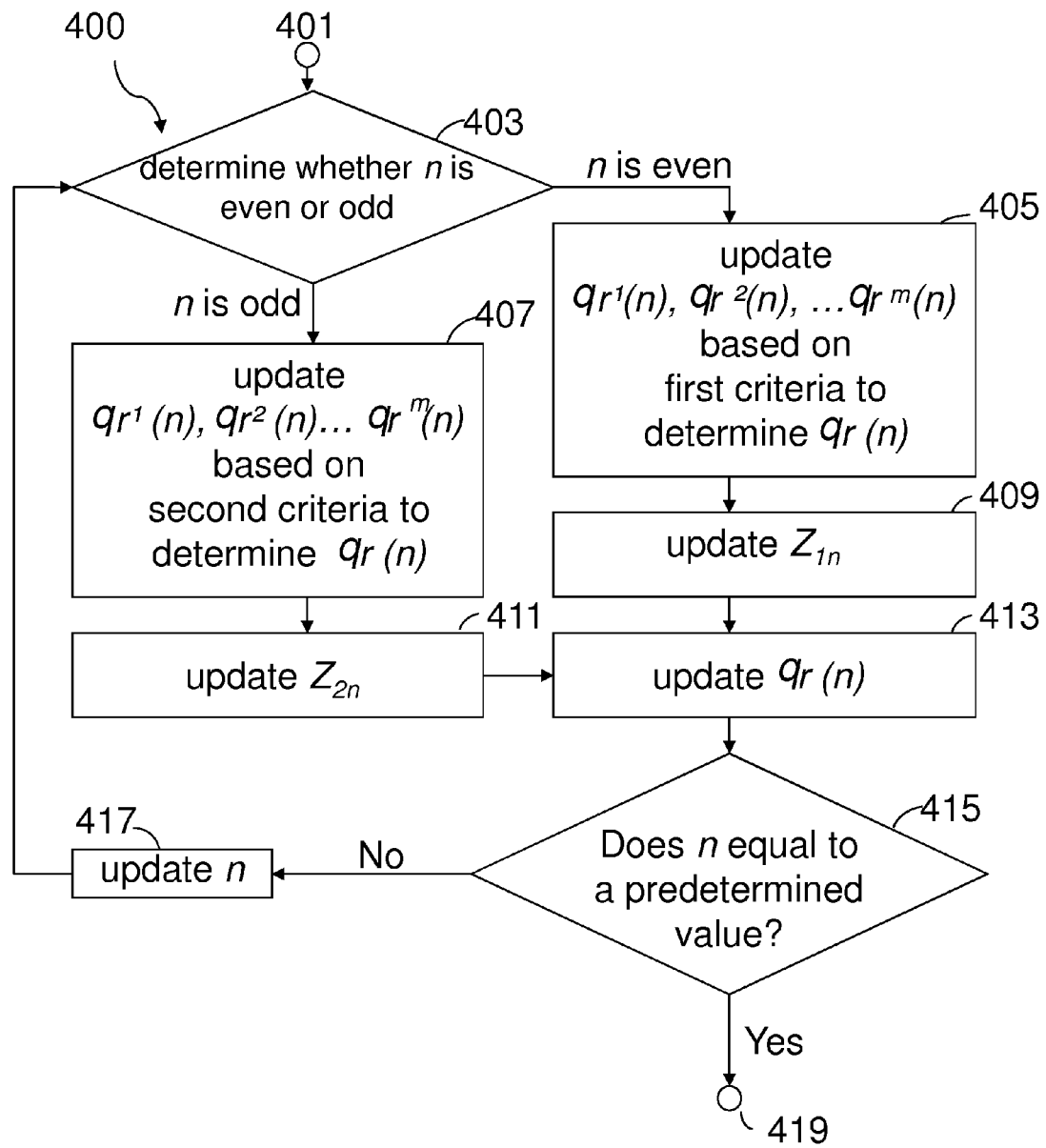
FIG. 4 is a flow chart illustrating another example process for determining appropriate retransmission probability for a source node in a wireless network through iteratively updating the values of $Z_{1n}$ and $Z_{2n}$.

FIG. 4 is a flow chart illustrating another example process 400 for determining the retransmission probability for a source node in a wireless network through iteratively updating the values of $Z_{1n}$ and $Z_{2n}$, arranged in accordance with at least some embodiments of the present disclosure. The number of time slots accumulated since the most recent successful transmission $K_n$ is measured, and the values of $Z_{1n}$ and $Z_{2n}$ are updated accordingly. In some embodiments of the disclosure, the retransmission probability for a source node is determined by the source node itself. Therefore, two different source nodes may have different retransmission probabilities.

The illustrated process 400 includes multiple paths to update the values of $Z_{1n}$ and $Z_{2n}$. To select among the different paths, a predetermined rule and a predetermined n value are considered. After having selected a path, the values of $Z_{1n}$ and $Z_{2n}$ are updated.

In an operation 401, the parameters to be considered in the illustrated process are defined. Some examples of the parameters include, without limitation, a retransmission probability $q_r(n)$, a random variable $\eta(n)$, a first step-size function $a(n)$, a second step-size function $b(n)$, a positive constant $\beta$ and an object function $h(K_n)$, where m and n may be an integer. These example parameters are used to achieve efficient convergence. In some implementations, $a(n)=1/n$ and $b(n)$ equals to $1/n^\alpha$, where $\alpha$ is in a range between 0.5 and 1.0. Initial values of some parameters, such as, without limitation, $a(0)$, $b(0)$, $\eta(0)$, $Z_{10}$, $Z_{20}$, and $q_r(0)$ are also defined in the operation 401. $Z_{1n}$ and $Z_{2n}$ generally also refer to an estimate of the average cost for the retransmission probability $q_r(n)$. The retransmission probability $q_r(n)$ is defined as the following:

$$q_r(n) = \begin{cases} q_r^1(n) & K_n \le 1 \\ q_r^2(n) & K_n = 2 \\ \cdots \\ \cdots \\ q_r^{m-1}(n) & K_n = m-1 \\ q_r^m(n) & K_n \ge m \end{cases} \quad (4)$$

In an operation 403, the value of n is utilized in a first predetermined rule. One example of the first predetermined rule is to see whether n is an even number or an odd number. When n is even, an operation 405 is selected. On the other hand, when n is odd, an operation 407 is selected.

In the operation 405, the value of $q_r^x(n)$ is replaced with the value of the sum of $q_r^x(n)$ and the product of $\eta(n)$ and $\beta$, where x is an integer from 1 to m. In addition, the number of time slots accumulated since the most recent successful transmission $K_n$ may be measured to determine the value of the retransmission probability $q_r(n)$ for a source node in the operation 405.

In the operation 407, the values of $q_r^x(n)$ in the equation (4) are replaced with the value of $q_r^x(n)$ deducting the product of $\eta(n)$ and $\beta$, where x is an integer from 1 to m. In addition, the number of time slots accumulated since the most recent successful transmission $K_n$ may be measured to determine the value of the retransmission probability $q_r(n)$ for a source node in the operation 407.

The operation 405 may proceed to an operation 409. The operation 409 includes updating the value of $Z_{1n}$ based on the LAST value of $Z_{1n}$, the second step-size function $b(n)$, the positive constant $\beta$, the random variable $\eta(n)$, and the object function $h(K_n)$. In some implementations, the object function $h(K_n)$ is the same as the object function set forth in the equation (1). The updating can be based on an equation (5) described below:

$$Z_{1n} = \text{LAST } Z_{1n} + \text{LAST } b(n)(\text{LAST } \eta(n)(h(K_n) - \text{LAST } Z_{1n}))/\beta \quad (5)$$

In the operation 409, the value of $Z_{2n}$ is set to equal to the LAST value of $Z_{2n}$. Then the illustrated process proceeds to an operation 413.

Similarly, the operation 407 may proceed to operation 411. The operation 411 includes updating the value of $Z_{2n}$ based on the LAST value of $Z_{2n}$, the second step-size function $b(n)$, the positive constant $\beta$, the random variable $\eta(n)$, and the object function $h(K_n)$. In some implementations, the object function $h(K_n)$ as set forth in the equation (1). The updating can be based on an equation (6) described below:

$$Z_{2n} = \text{LAST } Z_{2n} + \text{LAST } b(n)(\text{LAST } \eta(n)(h(K_n) - \text{LAST } Z_{2n}))/\beta \quad (6)$$

In the operation 411, the value of $Z_{1n}$ is set to equal to the LAST value of $Z_{1n}$. Then the illustrated process proceeds to an operation 413.

In the operation 413, the value of the retransmission probability $q_r(n)$ may be updated based on the equation (7) described below:

$$q_r(n) = \Upsilon(\text{LAST } q_r(n) - \text{LAST } a(n) \times (\text{LAST } Z_{1n} - \text{LAST } Z_{2n})) \quad (7)$$

where Y is a projection operator to keep the values of $q_r(n)$ to be within a range between 0 to 1. Then the illustrated process proceeds to an operation 415.

In the operation 415, the value n is compared with a predetermined value. When n does not equal to the predetermined value, the illustrated process 400 goes to an operation 417 where n is incremented by one. Then the operation 417 goes back to the operation 403. When n equals to the predetermined value, the illustrated process 400 proceeds to an operation 419 to terminate.

In some implementations, the object function $h(K_n)$ set forth above may be replaced with another object function defined as the following:

$$h(K_n) = \begin{cases} -1, & \text{if transmission is successful in the } n\text{th time slot} \\ 0, & \text{if there are no packets to send} \\ 0.5l, & \text{otherwise} \end{cases}$$

where l denotes the number of time slots since the most recent successful transmission.

Figure 5:
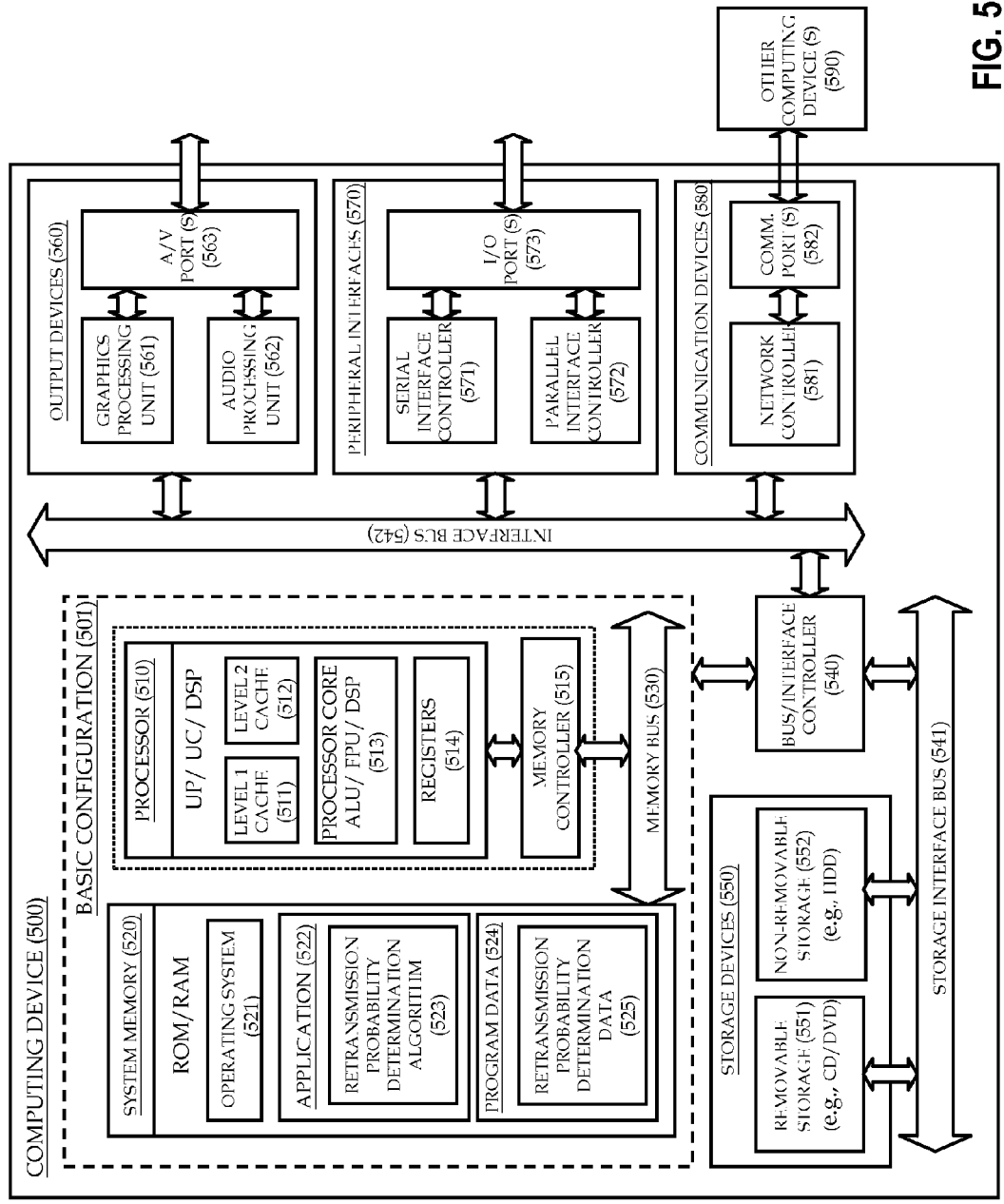
FIG. 5 is a block diagram illustrating an example computing device that is arranged for determining a retransmission probability for a source node in a wireless network.

FIG. 5 is a block diagram illustrating an example computing device 500 that is arranged for determining a retransmission probability for a source node in a wireless network, arranged in accordance with at least some embodiments of the present disclosure. In a very basic configuration 501, computing device 500 typically includes one or more processors 510 and system memory 520. A memory bus 530 may be used for communicating between the processor 510 and the system memory 520.

Depending on the desired configuration, processor 510 may be of any type including but not limited to a microprocessor (µP), a microcontroller (µC), a digital signal processor (DSP), or any combination thereof. Processor 510 may include one or more levels of caching, such as a level one cache 511 and a level two cache 512, a processor core 513, and registers 514. An example processor core 513 may include an arithmetic logic unit (ALU), a floating point unit (FPU), a digital signal processing core (DSP Core), or any combination thereof. An example memory controller 515 may also be used with the processor 510, or in some implementations the memory controller 515 may be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include a retransmission probability determination algorithm 523, which may be arranged to analyze data to determine a retransmission probability for a source node in a wireless network. Program Data 524 may include retransmission probability determination data 525, which may be associated with the one or more parameters set forth above. In some embodiments, application 522 may be arranged to operate with program data 524 on an operating system 521 such that the retransmission probability can be determined. This described basic configuration is illustrated in FIG. 5 by those components within dashed line 501.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which may be configured to communicate to various external devices such as a display device or speakers via one or more A/V ports 563. Example peripheral interfaces 570 include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which may be arranged to facilitate communications with one or more other computing devices 590 over a network communication link via one or more communication ports 582.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection. The term computer readable media as used herein may include storage media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

FIG. 6 is a block diagram illustrating a computer program product 600 for determining a retransmission probability for a source node in a wireless network, arranged in accordance with at least some embodiments of the disclosure. Computer program product 600 includes one or more sets of instructions 602 for executing the methods for transmitting data in a wireless communication system. For illustration only, the instructions 602 may reflect the method described above and illustrated in FIG. 4. In some implementations, instructions 602 may also reflect the method described above and illustrated in FIG. 2 and FIG. 3. The Computer program product 600 may be transmitted in a signal bearing medium 604 or another similar communication medium 606. Computer program product 600 may be recorded in a computer readable medium 608 or another similar recordable medium 610.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for retransmitting a packet in a second time slot for a source node in a wireless network, comprising:
    determining whether transmission of the packet in a first time slot is successful, wherein the first time slot is earlier in time than the second time slot;
    measuring a number of time slots accumulated since a most recent successful transmission by the source node;
    determining a first value of a retransmission probability based on a second value associated with the number of time slots accumulated, wherein the second value is determined based on an object function characterizing traffic conditions of the wireless network in a third time slot and a second step-size function associated with the third time slot; and
    retransmitting the packet in the second time slot based on the first value of the retransmission probability.

2. The method of claim 1, wherein the determining the first value of the retransmission probability is also based on a first step-size function.

3. The method of claim 1, wherein the object function characterizes a number of packets to be sent in the wireless network in the third time slot.

4. The method of claim 3, wherein the object function renders a third value when a first condition is met and renders a fourth value when the first condition is not met.

5. The method of claim 3, wherein the object function renders a third value when a first condition is met, renders a fourth value when a second condition is met, and renders a fifth value when neither the first condition nor the second condition is met.

6. The method of claim 1, wherein the method is configured to determine the first value of the retransmission probability for all source nodes in the wireless network.

7. A computing device configured to retransmit a packet in a second time slot for a source node in a wireless network, comprising:
    a processor coupled to a memory, wherein the processor is configured to
        determine whether transmission of the packet in a first time slot is successful, wherein the first time slot is earlier in time than the second time slot;
        measure a number of time slots accumulated since a most recent successful transmission by the source node;
        determine a first value of a retransmission probability based on a second value associated with the number of time slots accumulated, wherein the second value is determined based on an object function characterizing traffic conditions of the wireless network in a third time slot and a second step-size function associated with the third time slot; and
        retransmit the packet in the second time slot based on the first value of the retransmission probability.

8. The computing device of claim 7, wherein the computing device is configured in a node arranged to relay a packet from the source node to a destination node.

9. The computing device of claim 7, wherein the transmission of the packet in the first time slot is deemed successful if the source node receives acknowledgement of receiving the packet from a destination node.

10. The computing device of claim 7, wherein the transmission of the packet in the first time slot is deemed successful if the source node receives broadcast information indicating a packet transmission in the first time slot.

11. A non-transitory computer readable medium containing a sequence of instructions for retransmitting a packet in a second time slot for a source node in a wireless network, which when executed by a mobile device, causes the mobile device to:
    determine whether transmission of the packet in a first time slot is successful, wherein the first time slot is earlier in time than the second time slot;
    measure a number of time slots accumulated since a most recent successful transmission by the source node;
    determine a first value of a retransmission probability based on a second value associated with the number of time slots accumulated, wherein the second value is determined based on an object function characterizing traffic conditions of the wireless network in a third time slot and a second step-size function associated with the third time slot; and
    retransmit the packet in the second time slot based on the first value of the retransmission probability.

* * * * *

UNITED STATES PATENT AND TRADEMARK OFFICE
CERTIFICATE OF CORRECTION

PATENT NO. : 8,730,825 B2  
APPLICATION NO. : 12/533112  
DATED : May 20, 2014  
INVENTOR(S) : Bhatnagar Page 1 of 1

It is certified that error appears in the above-identified patent and that said Letters Patent is hereby corrected as shown below:

In the Specification

Column 6, Lines 66-67, in Equation (7), delete " $q_r(n) = Y(\text{LAST } q_r(n) - \text{LAST } a(n) \times (\text{LAST } Z_{1n} - \text{LAST } Z_{2n}))$ " and insert -- $q_r(n) = \Upsilon(\text{LAST } q_r(n) - \text{LAST } a(n) \times (\text{LAST } Z_{1n} - \text{LAST } Z_{2n}))$ --, therefor.

Column 7, Line 1, delete " $Y$ " and insert -- $\Upsilon$ --, therefor.

Signed and Sealed this  
Second Day of December, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,730,825 B2
APPLICATION NO. : 12/533112
DATED : May 20, 2014
INVENTOR(S) : Bhatnagar Page 1 of 1

It is certified that error appears in the above-identified patent and that said Letters Patent is hereby corrected as shown below:

On the Title Page, in item (73), under "Assignee", in Column 1, Line 1, delete "Indian Institute of Science (IN)" and insert -- Indian Institute of Science, Karnataka (IN) --, therefor.

Signed and Sealed this
Eleventh Day of August, 2015

Michelle K. Lee
*Director of the United States Patent and Trademark Office*